(12) United States Patent
Chang et al.

(10) Patent No.: US 12,088,114 B2
(45) Date of Patent: Sep. 10, 2024

(54) INDUCTIVE RESONANT WIRELESS CHARGING SYSTEM, RESONANT WIRELESS CHARGING TRANSMITTING DEVICE, WIRELESS CHARGING RELAY DEVICE AND INDUCTIVE WIRELESS CHARGING RECEIVING DEVICE

(71) Applicant: NATIONAL YANG MING CHIAO TUNG UNIVERSITY, Hsinchu (TW)

(72) Inventors: Edward Yi Chang, Hsinchu County (TW); Stone Cheng, Hsinchu (TW); Wei-Hua Chieng, Hsinchu (TW); Shyr-Long Jeng, Tainan (TW); Ching-Yao Liu, Kaohsiung (TW); Li-Chuan Tang, Taoyuan (TW)

(73) Assignee: NATIONAL YANG MING CHIAO TUNG UNIVERSITY, Hsinchu (TW)

( * ) Notice: Subject to any disclaimer, the term of this patent is extended or adjusted under 35 U.S.C. 154(b) by 412 days.

(21) Appl. No.: 17/471,326

(22) Filed: Sep. 10, 2021

(65) Prior Publication Data
US 2022/0344975 A1 Oct. 27, 2022

(30) Foreign Application Priority Data
Apr. 26, 2021 (TW) ................................. 110114938

(51) Int. Cl.
*H02J 50/12* (2016.01)
*H02J 50/20* (2016.01)
*H02J 50/40* (2016.01)

(52) U.S. Cl.
CPC .............. *H02J 50/12* (2016.02); *H02J 50/20* (2016.02); *H02J 50/40* (2016.02)

(58) Field of Classification Search
CPC .. H02J 50/12; H02J 50/20; H02J 50/40; H02J 50/50
(Continued)

(56) References Cited

U.S. PATENT DOCUMENTS

| 8,427,101 | B2 * | 4/2013 | Saunamaki | ........... H02J 50/502 320/108 |
| 9,018,898 | B2 * | 4/2015 | Ziv | ......................... H02J 50/40 320/108 |

(Continued)

FOREIGN PATENT DOCUMENTS

| CN | 105453434 | A | * | 3/2016 | ............... B66B 1/46 |
| CN | 102870338 | B | * | 2/2017 | .............. B60L 53/12 |

(Continued)

*Primary Examiner* — M Baye Diao
(74) *Attorney, Agent, or Firm* — MUNCY, GEISSLER, OLDS & LOWE, P.C.

(57) ABSTRACT

An inductive resonant wireless charging system includes a resonant wireless charging transmitting device, a wireless charging relay device and an inductive wireless charging receiving device. The resonant wireless charging transmitting device transmits a high-frequency radio frequency wave. The wireless charging relay device receives the high-frequency radio frequency wave using an electromagnetic resonance way, and converts the high-frequency radio frequency wave into a low-frequency radio frequency wave to transmit the low-frequency radio frequency wave. The inductive wireless charging receiving device receives the low-frequency radio frequency wave in a manner of electromagnetic induction.

12 Claims, 6 Drawing Sheets

(58) Field of Classification Search
USPC .......................................................... 320/108
See application file for complete search history.

(56) References Cited

U.S. PATENT DOCUMENTS

| | | | | |
|---|---|---|---|---|
| 9,762,082 | B2* | 9/2017 | Park | H02J 50/12 |
| 9,793,740 | B2* | 10/2017 | Kim | H02J 7/0068 |
| 9,837,828 | B2* | 12/2017 | Uchida | H02J 7/00034 |
| 9,997,959 | B2* | 6/2018 | Kim | H02J 50/50 |
| 10,020,687 | B2* | 7/2018 | Lecias | H02J 7/00034 |
| 10,038,389 | B2* | 7/2018 | Robertson | H02J 50/12 |
| 10,075,018 | B2* | 9/2018 | Park | H02J 50/402 |
| 10,291,036 | B2* | 5/2019 | Muratov | H02J 50/402 |
| 10,461,564 | B2* | 10/2019 | Yeon | H02J 50/12 |
| 10,958,104 | B2* | 3/2021 | Abdolkhani | H02J 50/12 |
| 11,271,431 | B2* | 3/2022 | Murray | H02J 7/0045 |
| 11,335,999 | B2* | 5/2022 | Singh | H03H 7/01 |
| 11,343,617 | B2* | 5/2022 | Arne | H04R 25/609 |
| 2007/0170884 | A1* | 7/2007 | Goetz | H02P 27/08 318/772 |
| 2012/0313445 | A1* | 12/2012 | Park | H02J 50/12 307/104 |
| 2015/0115725 | A1* | 4/2015 | Kang | H02J 50/12 307/104 |
| 2015/0171974 | A1* | 6/2015 | Perry | H02J 7/00034 307/104 |
| 2015/0180264 | A1* | 6/2015 | McFarthing | H01Q 1/44 320/108 |
| 2015/0365135 | A1* | 12/2015 | Miller | H02J 50/80 307/104 |
| 2017/0095667 | A1* | 4/2017 | Yakovlev | A61B 5/0022 |
| 2017/0149283 | A1* | 5/2017 | Ellwood, Jr. | H02J 50/50 |
| 2017/0194818 | A1* | 7/2017 | Kim | H02J 50/80 |
| 2018/0069432 | A1* | 3/2018 | Abdolkhani | H02J 50/10 |
| 2021/0188106 | A1* | 6/2021 | Asa | H02J 50/12 |
| 2022/0029477 | A1* | 1/2022 | He | H02J 50/60 |

FOREIGN PATENT DOCUMENTS

| | | | | |
|---|---|---|---|---|
| CN | 209913584 | U | * 1/2020 | ............ H02J 50/50 |
| JP | 2022523955 | A | * 4/2022 | ............ H02J 50/005 |
| KR | 20120119927 | A | * 11/2012 | ............ H02J 50/12 |
| TW | 202019055 | A | 5/2020 | |
| TW | 202205786 | A | * 2/2022 | ............ H01F 38/14 |

* cited by examiner

INDUCTIVE RESONANT WIRELESS CHARGING SYSTEM, RESONANT WIRELESS CHARGING TRANSMITTING DEVICE, WIRELESS CHARGING RELAY DEVICE AND INDUCTIVE WIRELESS CHARGING RECEIVING DEVICE

BACKGROUND

1. Field of the Disclosure

The present disclosure relates to a charging system and, more particularly, to an inductive resonant wireless charging system, a resonant wireless charging transmitting device, a wireless charging relay device, and an inductive wireless charging receiving device.

2. Description of Related Art

At present, there are three major wireless charging standards, namely the Qi standard launched by the Wireless Power Consortium (WPC), the A4WP standard launched by the Alliance for Wireless Power (A4WP), and the PMA standard launched by Power Matter Alliance (PMA). The Qi standard supports short-distance and low-power wireless charging, which is mainly charged by electromagnetic induction, and is the mainstream in the current market. However, its transmission distance is relatively short, which is generally about 5 millimeters (mm). In addition, the transmitter and receiver must be accurately aligned before proceeding with charging, and thus there are limitations in use. The A4WP standard may support long-distance wireless charging, in which charging is performed mainly by electromagnetic resonance, so that the charging speed and efficiency are poor. The PMA standard is similar to the Qi standard, but the relevant certification has not yet been launched.

Therefore, it can be seen that the current wireless charging standards are not unified, and the transmission frequencies used by various standards are also different. For example, the transmission frequency range of the Qi standard is 87 to 205 kilo hertz (KHz), while the transmission frequency of the A4WP standard is about 6.78 mega hertz (MHz), resulting in that the wireless charging devices designed with different standards are unable to operate with each other. Therefore, consumers must purchase chargers with different specifications for products with different specifications, and the use of the chargers is likely to be confused, while the manufacturers must spend more cost to develop products with different specifications, which is very inconvenient for consumers and manufacturers. Therefore, there is a need to have a technology that allows products to support multiple wireless charging standards at the same time.

In view of this, the present disclosure provides an inductive resonant wireless charging system, a resonant wireless charging transmitting device, a wireless charging relay device, and an inductive wireless charging receiving device to solve the aforementioned problems.

SUMMARY

An object of the present disclosure is to provide an inductive resonant wireless charging system, which includes: a resonant wireless charging transmitting device for transmitting a high-frequency radio frequency wave; a wireless charging relay device including a resonant receiving coil and an inductive transmitting coil, wherein the resonant receiving coil receives the high-frequency radio frequency wave in a manner of electromagnetic resonance, and the inductive transmitting coil transmits a low-frequency radio frequency wave; and an inductive wireless charging receiving device for receiving the low-frequency radio frequency wave in a manner of electromagnetic induction.

Another object of the present disclosure is to provide a resonant wireless charging transmitting device for use in the aforementioned inductive resonant wireless charging system, which has the characteristics of the resonant wireless charging transmitting device of the aforementioned inductive resonant wireless charging system.

Still another object of the present disclosure is to provide a wireless charging relay device for use in the aforementioned inductive resonant wireless charging system, which has the characteristics of the wireless charging relay device of the aforementioned inductive resonant wireless charging system.

Yet another object of the present disclosure is to provide an inductive wireless charging receiving device for use in the aforementioned inductive resonant wireless charging system, which has the characteristics of the inductive wireless charging receiving device of the aforementioned inductive resonant wireless charging system.

Other objects, advantages, and novel features of the disclosure will become more apparent from the following detailed description when taken in conjunction with the accompanying drawings.

DETAILED DESCRIPTION

The following embodiments describe the implementation and operation principles of the present disclosure. Those skilled in the art to which the present disclosure pertains may understand the features and effects of this disclosure through the above-mentioned embodiments, and may perform combination, modification, replacement or adaption based on the spirit of the present disclosure The term "connected" as used herein refers to aspects such as direct connection or indirect connection, and is not limited thereto. The term "when . . . " herein may denote "during the time that . . . ", "before . . . ", or "after . . . " and is not limited thereto.

The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

Figure 1:
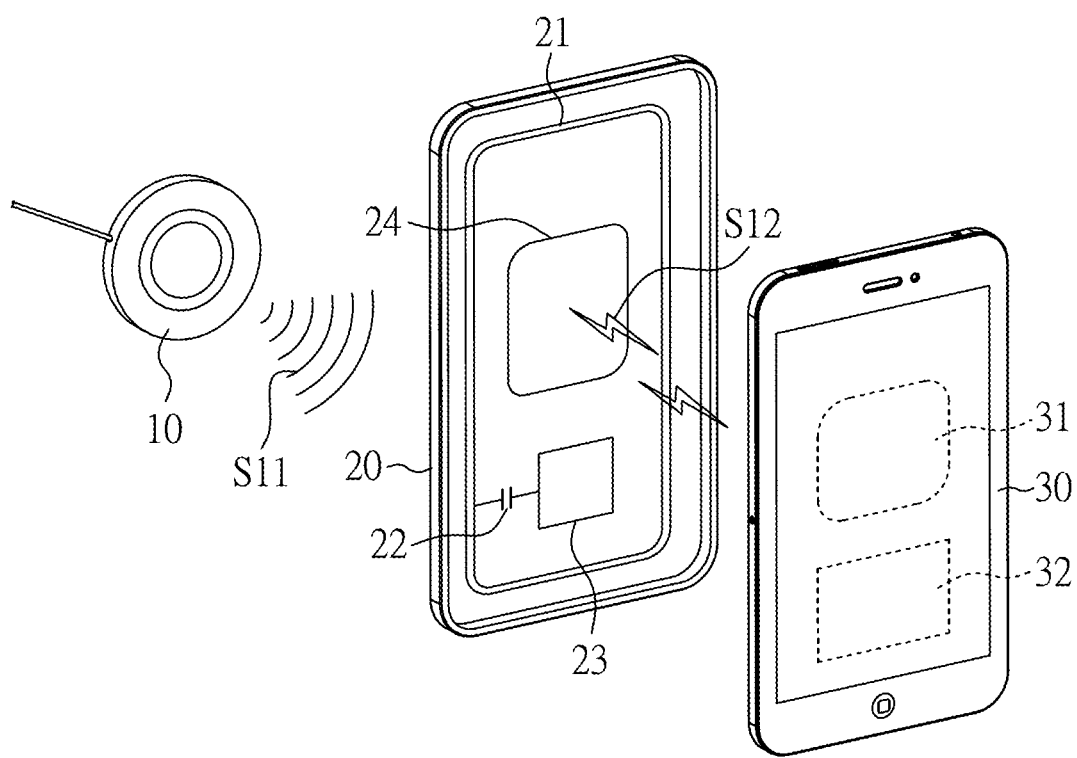
FIG. 1 is a schematic diagram illustrating the basic structure of an inductive resonant wireless charging system according to an embodiment of the present disclosure.
Figure 2:
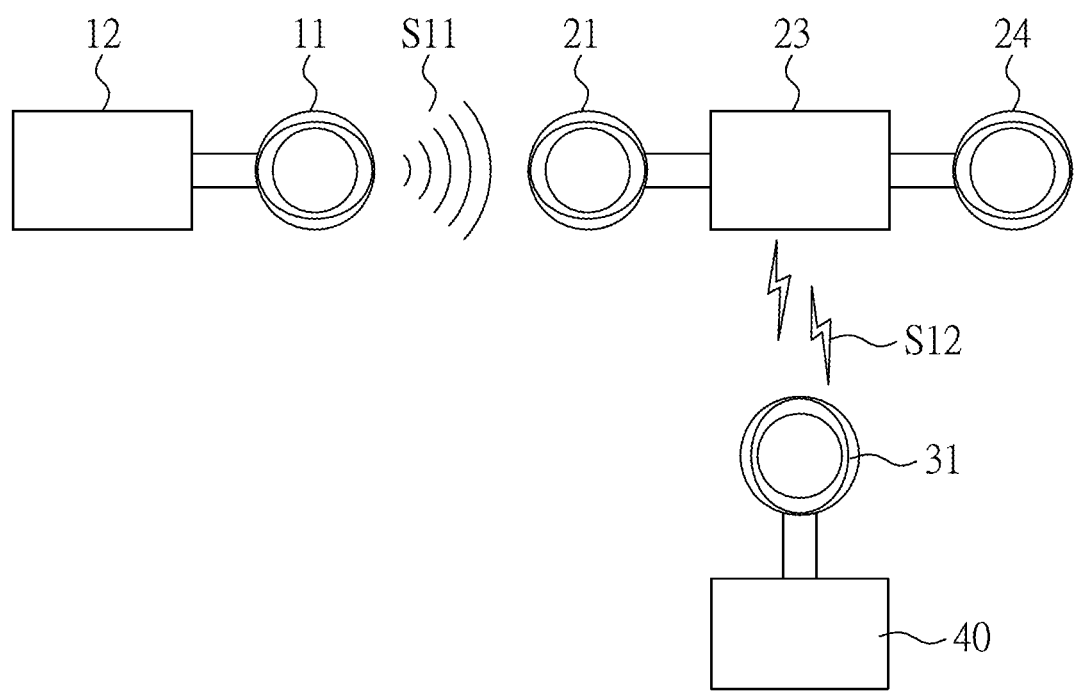
FIG. 2 is a schematic diagram illustrating the operation of an inductive resonant wireless charging system according to an embodiment of the present disclosure.

FIG. 1 is a schematic diagram illustrating the basic structure of an inductive resonant wireless charging system 1 according to an embodiment of the present disclosure, and FIG. 2 is a schematic diagram illustrating the operation of the inductive resonant wireless charging system 1 according to an embodiment of the present disclosure. As shown in FIGS. 1 and 2, the inductive resonant wireless charging system 1 includes a resonant wireless charging transmitting device 10, a wireless charging relay device 20 and an inductive wireless charging receiving device 30. The resonant wireless charging transmitting device 10 is provided to transmit high-frequency radio frequency wave S11. The wireless charging relay device 20 is provided to receive the high-frequency radio frequency wave S11 in a manner of electromagnetic resonance, and convert the high-frequency radio frequency wave S11 into the low-frequency radio frequency wave S12 for being transmitted. The inductive wireless charging receiving device 30 is provided to receive low-frequency radio frequency wave S12 in a manner of electromagnetic induction.

In one embodiment, the resonant wireless charging transmitting device 10 includes a resonant transmitting coil 11 and an energy supply end 12, wherein the resonant transmitting coil 11 is provided to transmit energy provided by the energy supply end 12 in the form of high-frequency radio frequency wave S11. The wireless charging relay device 20 includes a resonant receiving coil 21, a first variable capacitor 22, a control module 23, and an inductive transmitting coil 24. The resonant receiving coil 21 is provided to receive high-frequency radio frequency wave S11. The control module 23 is provided to convert the high-frequency radio frequency wave S11 into a low-frequency radio frequency wave S12. The inductive transmitting coil 24 is provided to transmit the low-frequency radio frequency wave S12 to the inductive wireless charging receiving device 30. The inductive wireless charging receiving device 30 includes an inductive receiving coil 31 for receiving the low-frequency radio frequency wave S12 transmitted by the inductive transmitting coil 24. In addition, the wireless charging receiving device 30 is further electrically connected to a battery component 40 to transmit the low-frequency radio frequency wave S12 to the battery component 40 for proceeding with charging.

In one embodiment, the high-frequency radio frequency wave S11 has a resonant frequency f1, where the resonant frequency f1 is between 3 and 30 MHz (that is, 3 MHz≤f1≤30 MHz), so that a long-distance energy transmission is performed between resonant wireless charging transmitting device 10 and the wireless charging relay device 20 in an electromagnetic resonance manner that conforms to the A4WP standard. In one embodiment, a transmission distance d1 of the high-frequency radio frequency wave S11 may be approximately 4 to 6 meters (m) (d1≤4~6 m), but it is not limited thereto.

In one embodiment, the low-frequency radio frequency wave S12 has a resonant frequency f2, where the resonant frequency f2 is between 30 and 300 kHz (that is, 30 kHz≤f2≤300 kHz), so that a short-distance energy transmission is performed between the wireless charging relay device 20 and the inductive wireless charging receiving devices 30 in an electromagnetic induction manner that conforms to the Qi standard. In one embodiment, a transmission distance d2 of the low-frequency radio frequency wave S12 may be up to 5 to 40 millimeters (mm) (ie, d2≤5~40 mm), but it is not limited thereto.

In one embodiment, the inductive wireless charging receiving device 30 may be an electronic device; however, in other embodiments, the inductive wireless charging receiving device 30 may be a wireless charging component disposed inside the electronic device.

In one embodiment, the wireless charging relay device 20 may be a protective housing (but not limited to this) of an electronic device (such as the inductive wireless charging receiving device 30), and the resonant wireless charging transmitting device 10 may be an energy transmitting device arranged outside the electronic device. Therefore, the energy transmitting device may first transmit energy to the protective housing of the electronic device over a relatively long distance, and then the protective housing of the electronic device performs a short-distance energy transmission with the electronic device, so that the battery inside the electronic device (such as a battery component 40) performs charging. In this way, if there is a distance between the electronic device and the energy transmitting device, the protective housing may be used for long-distance wireless charging according to the A4WP standard, and then the energy may be transmitted to the electronic device over a short distance through the protective housing according to the Qi standard. In addition, since the protective housing is installed on the electronic device, the alignment relationship therebetween can be maintained. Therefore, as long as the electronic device is within the transmission range of the energy transmitting device, wireless charging may be performed at any time, and the user may use the electronic device without being restricted.

As a result, the present disclosure may improve the problems of the prior art.

Next, the operation details of the resonant wireless charging transmitting device 10, the wireless charging relay device 20, and the inductive wireless charging receiving device 30 will be described.

Figure 3:
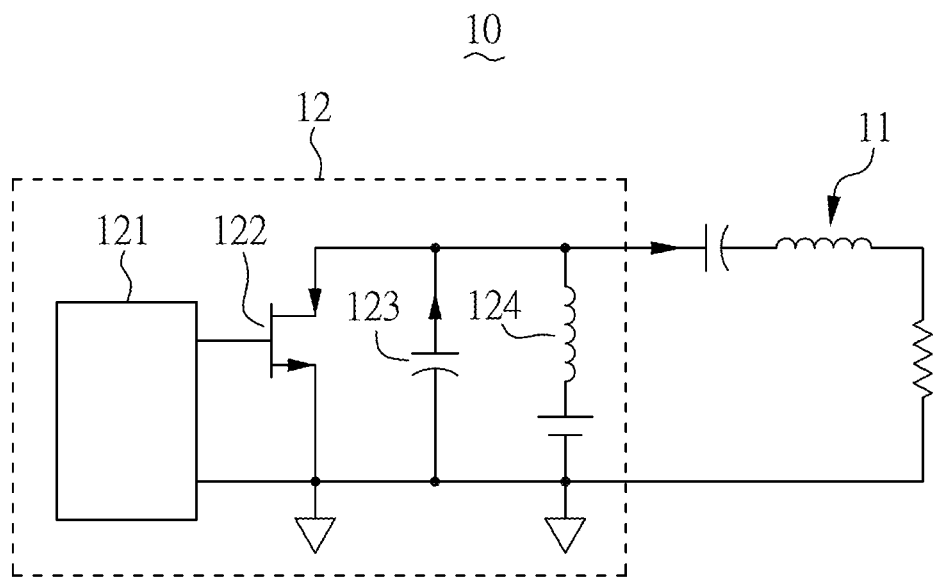
FIG. 3 is an equivalent circuit diagram of a resonant wireless charging transmitting device according to an embodiment of the present disclosure.

First, regarding the resonant wireless charging transmitting device 10, FIG. 3 is an equivalent circuit diagram of a resonant wireless charging transmitting device 10 according to an embodiment of the present disclosure. Please refer to FIG. 3 and FIGS. 1 and 2 at the same time. As shown in FIG. 3, the energy supply end 12 of the resonant wireless charging transmitting device 10 is connected to an external power source (such as mains power) and uses a class E power amplifier as a wireless charging power amplifier, and is further provided with a zero voltage switching control circuit 121 and a zero voltage switch 122 to switch the frequency of the transmitted electric wave. Since the class E power amplifier adopts the zero voltage switch control mechanism, the loss during frequency switching can be reduced. Moreover, the class E power amplifier used as a wireless charging power amplifier to transmit wireless charging signals is known in the prior art (such as A4WP-standard transmitting devices), and thus a detailed description is deemed unnecessary. The following describes the difference between the present disclosure and the prior art.

In the prior art, the zero voltage switch of the class E power amplifier usually includes a silicon transistor, but in the class E power amplifier of the present disclosure, the zero voltage switch 122 may include a gallium nitride (GaN) transistor. The gallium nitride transistor has the characteristics of high electron mobility, which allows the class E power amplifier of the present disclosure to have a higher switching frequency, and also improves the power density and transient performance while maintaining reasonable switching loss, so as to improve the heat dissipation capability of the resonant wireless charging transmitting device 10 thereby preventing the heat dissipation of the internal power components from affecting the operation.

Therefore, the operation details of the resonant wireless charging transmitting device 10 can be understood.

Figure 4:
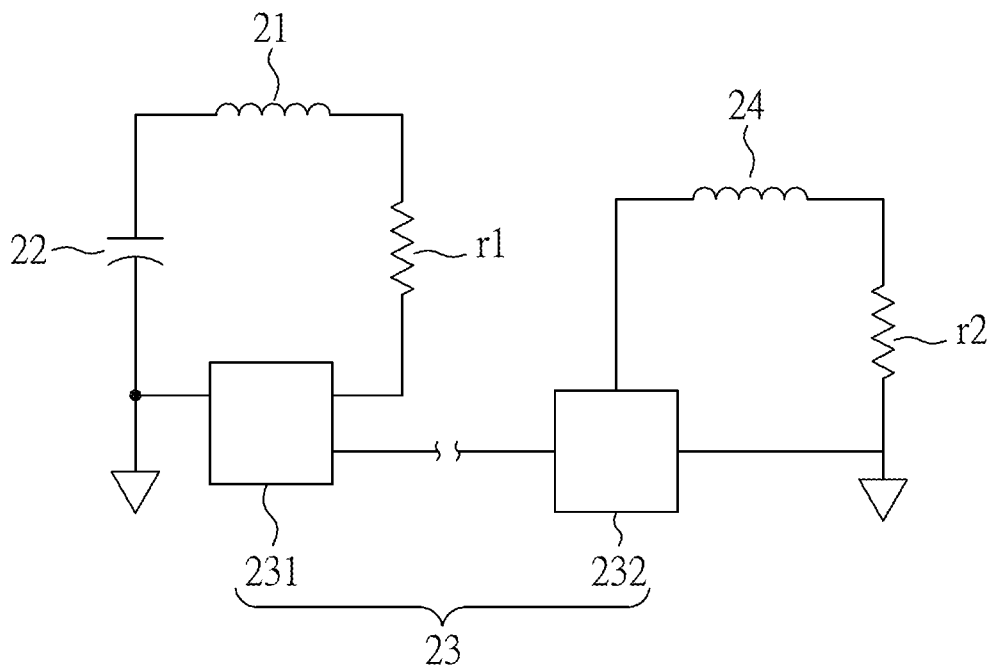
FIG. 4 is a schematic diagram illustrating an equivalent circuit of a wireless charging relay device according to an embodiment of the present disclosure.

Next, the details of the wireless charging relay device 20 will be described. FIG. 4 is a schematic diagram of an equivalent circuit of the wireless charging relay device 20 according to an embodiment of the present disclosure, and please refer to FIG. 4 and FIGS. 1 to 3 at the same time. As shown in FIG. 4 the control module 23 includes a resonant adjustment sub-circuit 231 and a frequency conversion sub-circuit 232. In addition, the resonant receiving coil 21 may be equivalent to an inductor, and is connected in series with the first variable capacitor 22, the resonant adjustment sub-circuit 231, and a resistor r1 (for example, as a load). In addition, the inductive transmitting coil 24 may be equivalent to an inductor, and may be connected in series with a frequency conversion sub-circuit 232 and a resistor r2 (for example, as a load).

In one embodiment, the resonant adjustment sub-circuit 231 and the frequency conversion sub-circuit 232 can be integrated in the same chip, but in another embodiment, they can also be separately disposed on different chips and electrically connected to each other.

In one embodiment, the resonant adjustment sub-circuit 231 can be used to adjust the capacitance value of the first variable capacitor 22, so that the resonant receiving coil 21 reaches the same resonant frequency f1 as the high-frequency radio frequency wave S11, thereby achieving A4WP-standard electromagnetic resonance. For example, the resonant frequency of the high-frequency radio frequency wave S11 may be a predetermined value, and the resonant adjustment sub-circuit 231 may adjust the capacitance value of the first variable capacitor 22 according to the predetermined value, but the present disclosure is not limited thereto. In one embodiment, the resonant adjustment sub-circuit 231 may transmit the high-frequency radio frequency wave S11 received by the resonant receiving coil 21 to the frequency conversion sub-circuit 232, and the frequency conversion sub-circuit 232 may convert the high-frequency radio frequency wave S11 into a low-frequency radio frequency signal S12. In one embodiment, the frequency conversion sub-circuit 232 is, for example, a frequency modulation circuit, but it is not limited thereto.

In addition, the control module 23 may further include more circuits with different functions so as to assist in controlling the energy transmitting and receiving of the resonant receiving coil 21 and the inductive transmitting coil 24.

In addition, in one embodiment, the wireless charging relay device 20 may generate an equivalent circuit through electromagnetic induction performed with the inductive wireless charging receiving device 30, so that the overall circuit of the wireless charging relay device 20 forms an impedance matching circuit corresponding to the maximum power output of electromagnetic induction.

In this way, the operation details of the wireless charging relay device 20 can be understood.

Figure 5:
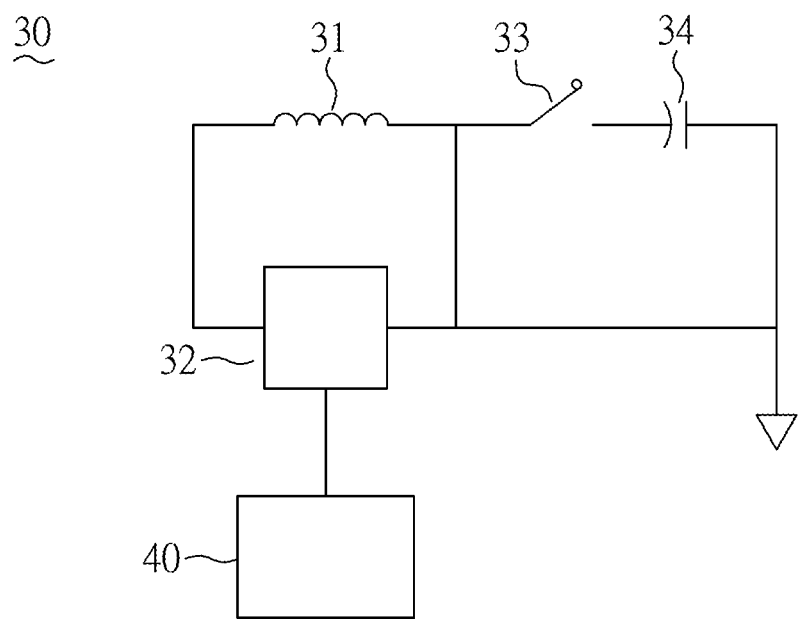
FIG. 5 is a schematic diagram illustrating an equivalent circuit of an inductive wireless charging receiving device according to an embodiment of the present disclosure.

Next, the operation details of the inductive wireless charging receiving device 30 will be described. FIG. 5 is a schematic diagram of an equivalent circuit of an inductive wireless charging receiving device 30 according to an embodiment of the present disclosure, and please refer to FIG. 5 and FIGS. 1 to 4 at the same time.

As shown in FIG. 5, the inductive receiving coil 31 may be equivalent to an inductor and is electrically connected to a control circuit 32, and the control circuit 32 may be further electrically connected to the battery component 40.

In one embodiment, the control circuit 32 may control the inductive receiving coil 31 to receive energy, and transmit the received energy to the battery component 40. In one embodiment, the control circuit 32 may be the processor of the electronic device itself, but may also be an additional control circuit, and is not limited thereto.

In addition, in one embodiment, the inductive wireless charging receiving device 30 may further include an inductive resonant switch 33 and a second variable capacitor 34. In one embodiment, when the inductive resonant switch 33 is turned on (that is, conducted), the inductive receiving coil 31 is connected in parallel with the second variable capacitor 34. At this time, the control circuit 32 may adjust the capacitance value of the second variable capacitor 34 to enable the inductive receiving coil 31 to reach the resonant frequency f1 of the high-frequency radio frequency wave S11, and directly receive the high-frequency radio frequency wave S11 transmitted by the resonant wireless charging transmitting device 10. As a result, the inductive wireless charging receiving device 30 may directly perform wireless charging according to the A4WP standard.

In one embodiment, when the inductive resonant switch 33 is turned off (that is, not conducted), an open circuit is formed between the inductive receiving coil 31 and the second variable capacitor 34, and the inductive receiving coil 31 receives low-frequency radio frequency wave in a manner of electromagnetic induction. As a result, the inductive wireless charging receiving device 30 of the present disclosure is provided with the function of switching between inductive wireless charging and resonant wireless charging, and thus the product can support both the Qi standard and the A4WP standard, so that the user will be more convenient in use, and the manufacturer's development costs can be reduced.

In addition, in one embodiment, the receiving power of the inductive wireless charging receiving device 30 may be between 4 to 6 watts, such as 5 watts, but is not limited thereto.

Therefore, the details of the inductive wireless charging receiving device 30 can be understood.

The present disclosure may have various implementation aspects, which will be illustrated below with examples.

Figure 6:
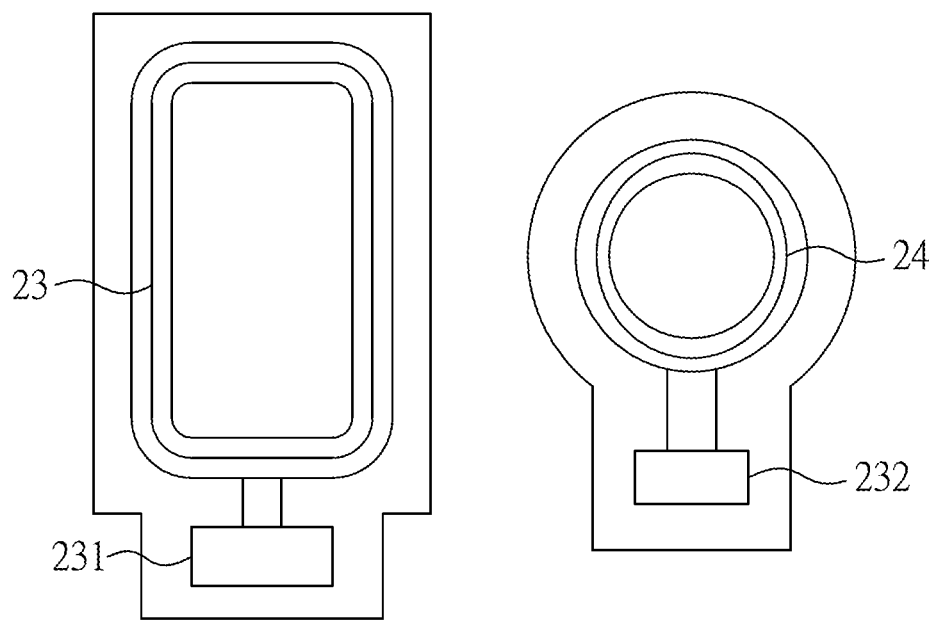
FIG. 6 is a schematic diagram illustrating a wireless charging relay device according to another embodiment of the present disclosure.

FIG. 6 is a schematic diagram illustrating a wireless charging relay device 20 according to another embodiment of the present disclosure, and please refer to FIG. 6 and FIGS. 1 to 5 at the same time.

In the embodiment of FIG. 1, the wireless charging relay device 20 is a protective housing of the electronic device, and the protective housing includes a resonant receiving coil 21, a first variable capacitor 22, a control module 23, and an inductive transmitting coil 24. In the embodiment of FIG. 6, the wireless charging relay device 20 may be a conductive sticker for being attached to the electronic device or the protective housing of the electronic device. In other words, the resonant receiving coil 21, the first variable capacitor 22, the control module 23 and the inductive transmitting coil 24 may all be arranged on the conductive sticker; however, the present disclosure is not limited to this.

Figure 7:
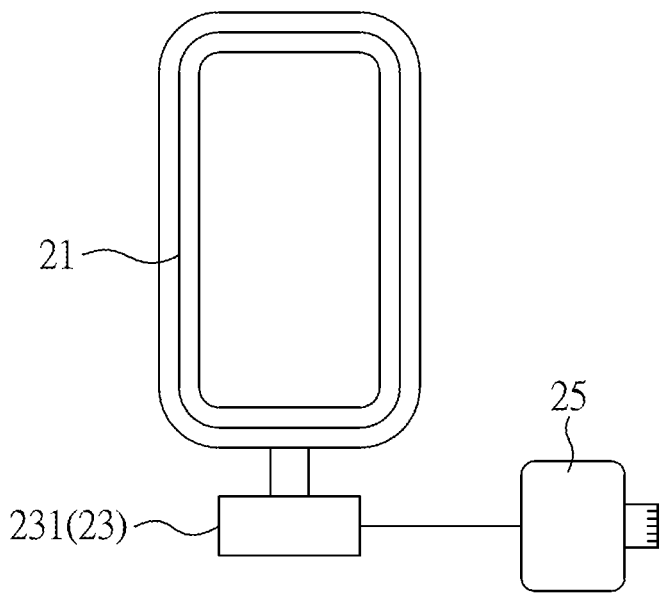
FIG. 7 is a schematic diagram illustrating a wireless charging relay device according to another embodiment of the present disclosure.

FIG. 7 is a schematic diagram illustrating a wireless charging relay device 20 according to another embodiment of the present disclosure, and please refer to FIG. 7 and FIGS. 1 to 6 at the same time.

Figure 8:
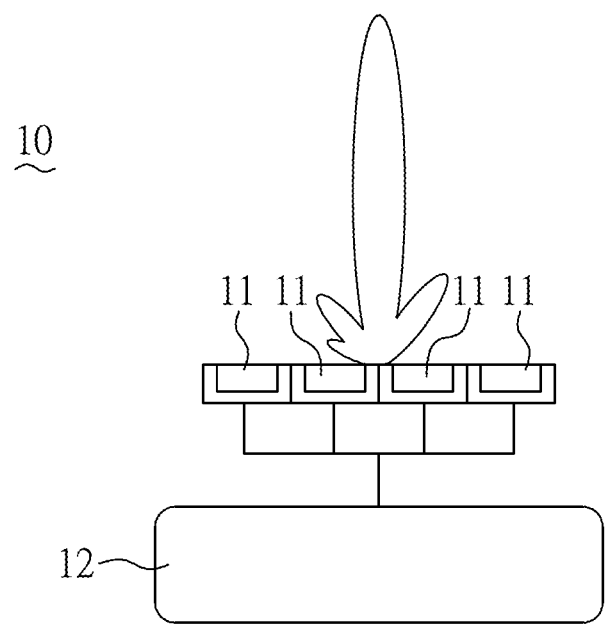
FIG. 8 is a schematic diagram illustrating a resonant wireless charging transmitting device according to another embodiment of the present disclosure.

As shown in FIG. 7, the control module 23 (or resonant adjustment sub-circuit 231) electrically connected to the resonant receiving coil 21 is electrically connected to a charging connector 25, and the charging connector 25 is inserted in an charging hole of the electronic device. Therefore, after receiving the high-frequency radio frequency wave S11, the wireless charging relay device 20 may directly transmit energy to the electronic device through the charging connector 25, so as to directly charge the electronic device. However, the present disclosure is not limited to this. FIG. 8 is a schematic diagram illustrating a resonant wireless charging transmitting device 10 according to another embodiment of the present disclosure, and please refer to FIG. 8 and FIGS. 1 to 7 at the same time.

In this embodiment, the high-frequency radio frequency wave S11 may be a beam-forming wave, wherein the resonant wireless charging transmitting device 10 may include a plurality of resonant transmitting coils 11, and the resonant transmitting coils 11 may be arranged in accordance with a specific way so as to achieve beam-forming. In one embodiment, when the high-frequency radio frequency wave S11 is a single wave, the transmission distance d may reach about 40-60 cm (that is, d1≤40~60 cm). In one embodiment, when the high-frequency radio frequency wave S11 is a beam-forming wave, for example, composed of 4 resonant transmitting coils 11, the transmission distance d1 may reach about 4 to 6 meters (that is, d1≤4~6 m), for example 5 meters. However, the present disclosure is not limited to this.

Through the aforementioned embodiments and the combination thereof, the present disclosure may be extended to more applications. An example is described below.

Figure 9:
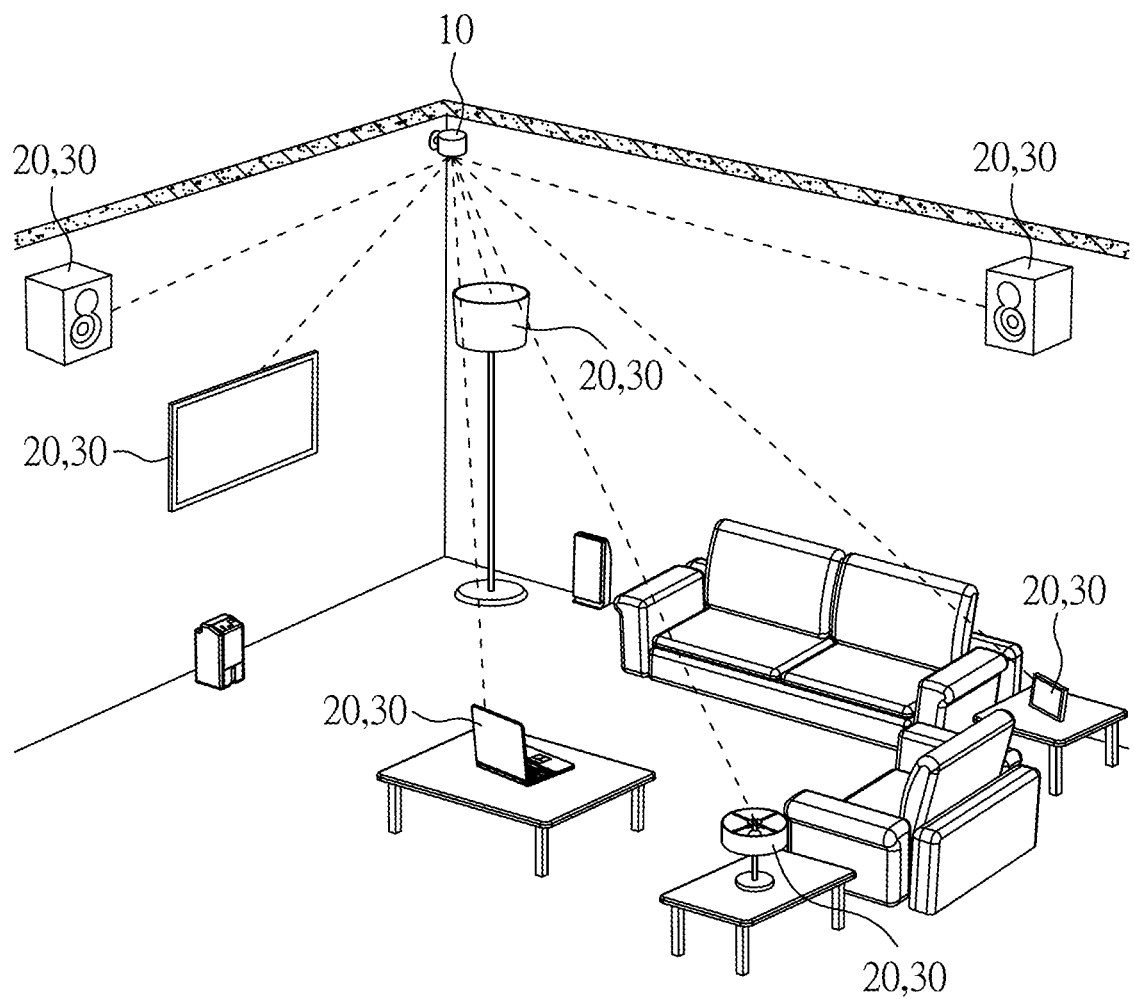
FIG. 9 is a schematic diagram illustrating an application of an inductive resonant wireless charging system according to an embodiment of the present disclosure.

FIG. 9 is a schematic diagram illustrating an application of the inductive resonant wireless charging system 1 according to an embodiment of the present disclosure, and please refer to FIG. 9 and FIGS. 1 to 8 at the same time. As shown in FIG. 9, the inductive wireless charging receiving device 30 may be various electronic devices (or installed inside the electronic device), such as speakers, lights, notebook computers, mobile phones, tablet computers, smart photo frames, television sets, etc., but is not limited to this. The wireless charging relay device 20 may be a protective housing of various electronic devices, or may be attached to the electronic device or the protective housing in the form of a conductive sticker. At this moment, as long as at least one resonant wireless charging transmitting device 10 is installed in the same space, the resonant wireless charging transmitting device 10 (for example, beam-forming is used to increase the energy transmission distance) may perform wireless charging sequentially or simultaneously on the electronic devices at various positions in the space at the same time, so that each electronic device no longer needs a power cord, which saves space and greatly improves the convenience of use, while the present disclosure is not limited to this.

Accordingly, the present disclosure provides an improved inductive resonant wireless charging system, a resonant wireless charging transmitting device, a wireless charging relay device, and an inductive wireless charging receiving device, which can simultaneously support different wireless charging standards. The present disclosure can be provided with the long-distance transmission function of A4WP standard and the charging efficiency of Qi standard at the same time, so as to greatly improve the convenience in use and save the manufacturing cost.

The aforementioned embodiments are examples only for convenience of description. The scope of the present disclosure is claimed hereinafter in the claims and is not limited to the embodiments.

What is claimed is:

1. An inductive resonant wireless charging system, comprising: a resonant wireless charging transmitting device for transmitting a high-frequency radio frequency wave; a wireless charging relay device including a resonant receiving coil, a first variable capacitor and an inductive transmitting coil, wherein the resonant receiving coil receives the high-frequency radio frequency wave in a manner of electromagnetic resonance, and the inductive transmitting coil transmits a low-frequency radio frequency wave; and an inductive wireless charging receiving device for receiving the low-frequency radio frequency wave in a manner of electromagnetic induction;

wherein the inductive wireless charging receiving device includes an inductive receiving coil, a second variable capacitor and an inductive resonant switch, in which, when the inductive resonant switch is turned on, the inductive receiving coil and the second variable capacitor form a parallel structure, and the inductive receiving coil receives the high-frequency radio frequency wave in the manner of electromagnetic resonance, and when the inductive resonant switch is turned off, the inductive receiving coil receives the low-frequency radio frequency wave in the manner of electromagnetic induction.

2. The inductive resonant wireless charging system of claim 1, wherein the wireless charging relay device further includes a control module, in which the control module adjusts the first variable capacitor to enable the resonant receiving coil to reach a resonant frequency of the high-frequency radio frequency wave, and converts the high-frequency radio frequency wave into a low-frequency radio frequency wave.

3. The inductive resonant wireless charging system of claim 1, wherein the wireless charging relay device generates an equivalent circuit through the manner of electromagnetic induction performed with the inductive wireless charging receiving device, so that the wireless charging relay device forms an impedance matching circuit corresponding to a maximum power output of the manner of electromagnetic induction.

4. The inductive resonant wireless charging system of claim 1, wherein the inductive wireless charging receiving device is an electronic device, and the wireless charging relay device is a protective housing of the electronic device or a conductive sticker attached to the electronic device of the protective housing of the electronic device.

5. The inductive resonant wireless charging system of claim 1, wherein the inductive wireless charging receiving device has a receiving power of 4 to 6 watts.

6. The inductive resonant wireless charging system of claim 1, wherein a resonant frequency of the high-frequency radio frequency wave is between 3 and 30 MHz, and a resonant frequency of the low-frequency radio frequency wave is between 30 and 300 kHz.

7. The inductive resonant wireless charging system of claim 1, wherein the resonant wireless charging transmitting device includes a power amplifier circuit, in which a switch of the power amplifier circuit is a gallium nitride (GaN) transistor.

8. The inductive resonant wireless charging system of claim 1, wherein the manner of electromagnetic resonance adopts A4WP (Alliance for Wireless Power) standard, and the manner of electromagnetic induction adopts WPC Qi (Wireless Power Consortium Qi) standard.

9. The inductive resonant wireless charging system of claim 1, wherein the high-frequency radio frequency wave is a beam-forming electric wave.

10. A resonant wireless charging transmitting device used in an inductive resonant wireless charging system having a wireless charging relay device and an inductive wireless charging receiving device, wherein the resonant wireless charging transmitting device transmits a high-frequency radio frequency wave, the wireless charging relay device includes a resonant receiving coil, a first variable capacitor and an inductive transmitting coil, in which the resonant receiving coil receives the high-frequency radio frequency wave in a manner of electromagnetic resonance, and the inductive transmitting coil transmits a low-frequency radio frequency wave, and the inductive wireless charging receiving device receives the low-frequency radio frequency wave in a manner of electromagnetic induction;
  wherein the inductive wireless charging receiving device includes an inductive receiving coil, a second variable capacitor and an inductive resonant switch, in which, when the inductive resonant switch is turned on, the inductive receiving coil and the second variable capacitor form a parallel structure, and the inductive receiving coil receives the high-frequency radio frequency wave in the manner of electromagnetic resonance, and when the inductive resonant switch is turned off, the inductive receiving coil receives the low-frequency radio frequency wave in the manner of electromagnetic induction.

11. A wireless charging relay device used in an inductive resonant wireless charging system having a resonant wireless charging transmitting device and an inductive wireless charging receiving device, wherein the resonant wireless charging transmitting device transmits a high-frequency radio frequency wave, the wireless charging relay device includes a resonant receiving coil, a first variable capacitor and an inductive transmitting coil, in which the resonant receiving coil receives the high-frequency radio frequency wave in a manner of electromagnetic resonance, and the inductive transmitting coil transmits a low-frequency radio frequency wave, and the inductive wireless charging receiving device receives the low-frequency radio frequency wave in a manner of electromagnetic induction;
  wherein the inductive wireless charging receiving device includes an inductive receiving coil, a second variable capacitor and an inductive resonant switch, in which, when the inductive resonant switch is turned on, the inductive receiving coil and the second variable capacitor form a parallel structure, and the inductive receiving coil receives the high-frequency radio frequency wave in the manner of electromagnetic resonance, and when the inductive resonant switch is turned off, the inductive receiving coil receives the low-frequency radio frequency wave in the manner of electromagnetic induction.

12. An inductive wireless charging receiving device used in an inductive resonant wireless charging system having a resonant wireless charging transmitting device and a wireless charging relay device, wherein the resonant wireless charging transmitting device transmits a high-frequency radio frequency wave, the wireless charging relay device includes a resonant receiving coil, a first variable capacitor and an inductive transmitting coil, in which the resonant receiving coil receives the high-frequency radio frequency wave in a manner of electromagnetic resonance, and the inductive transmitting coil transmits a low-frequency radio frequency wave, and the inductive wireless charging receiving device receives the low-frequency radio frequency wave in a manner of electromagnetic induction;
  wherein the inductive wireless charging receiving device includes an inductive receiving coil, a second variable capacitor and an inductive resonant switch, in which, when the inductive resonant switch is turned on, the inductive receiving coil and the second variable capacitor form a parallel structure, and the inductive receiving coil receives the high-frequency radio frequency wave in the manner of electromagnetic resonance, and when the inductive resonant switch is turned off, the inductive receiving coil receives the low-frequency radio frequency wave in the manner of electromagnetic induction.

\* \* \* \* \*